United States Patent
Tanimura

(10) Patent No.: US 7,304,778 B2
(45) Date of Patent: Dec. 4, 2007

(54) OPTICAL SCANNING SYSTEM AND IMAGE FORMING APPARATUS USING THE SAME

(75) Inventor: Ken Tanimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/617,081

(22) Filed: Dec. 28, 2006

(65) Prior Publication Data

US 2007/0159520 A1    Jul. 12, 2007

(30) Foreign Application Priority Data

Dec. 28, 2005   (JP) .............................. 2005/378712

(51) Int. Cl.
*G02B 26/08*   (2006.01)
(52) U.S. Cl. ..................... 359/205; 347/259
(58) Field of Classification Search ............ None
See application file for complete search history.

(56) References Cited

U.S. PATENT DOCUMENTS

| | | | |
|---|---|---|---|
| 5,694,236 A * | 12/1997 | Sekikawa .................. | 359/206 |
| 6,803,942 B2 | 10/2004 | Sato et al. | |
| 7,034,859 B2 | 4/2006 | Ishihara et al. | |
| 2006/0091306 A1 * | 5/2006 | Yoshida et al. ............ | 250/234 |

FOREIGN PATENT DOCUMENTS

| | | |
|---|---|---|
| JP | 2002-365574 | 12/2002 |
| JP | 2004-070108 | 3/2004 |

* cited by examiner

Primary Examiner—James Phan
(74) Attorney, Agent, or Firm—Fitzpatrick, Cella, Harper & Scinto

(57) ABSTRACT

An optical scanning system and an image forming apparatus with such optical scanning system, include a light source, an optical deflector having a deflecting surface, for scanningly deflecting a light beam emitted from the light source means, and an imaging optical system for imaging the light beam, deflected by the deflecting surface of the optical deflector, upon a scan surface to be scanned, wherein, when $\gamma$ ($\gamma \neq 0$) refers to an angle which is defined, in a sub-scan sectional plane, between a principal ray of the light beam from the light source means and a normal to the deflecting surface of the optical deflector as the light beam is going to be incident on the deflecting surface, $\beta$ refers to an imaging magnification of the imaging optical system with respect to a sub-scan direction, W [mm] refers to a light-beam width, in a main-scan direction, of a light beam that passes a light exit surface of an imaging optical element, of the imaging optical system, which element is closest to the scan surface, and $\epsilon$ ($\epsilon \neq \gamma$) refers to an angle defined, in the sub-scan sectional plane, between an optical axis of the imaging optical system and a straight line that connects a point of deflection of the light beam incident on the deflecting surface of the optical deflector and an imaging point of the light beam being imaged on the scan surface, a relation $$\frac{1+\beta}{\beta} \times |\tan(\gamma - \varepsilon)| \times W \le 0.15 \text{ [mm]}$$

is satisfied.

8 Claims, 13 Drawing Sheets

OPTICAL SCANNING SYSTEM AND IMAGE FORMING APPARATUS USING THE SAME

FIELD OF THE INVENTION AND RELATED ART

This invention relates to an optical scanning system and an image forming apparatus using the same. Particularly, the present invention is suitably applicable to image forming apparatuses such as laser beam printers, digital copying machines and multi-function printers having an electrophotographic process, for example.

In optical scanning systems used in a laser beam printer (LBP) or the like, a light beam is optically modulated and emitted from a light source means in accordance with an imagewise signal, and it is then periodically deflected by means of an optical deflector having a rotary polygonal mirror (polygon mirror), for example. The thus deflected light beam is focused into a light spot upon the surface of a photosensitive recording medium (photosensitive drum) by means of an imaging optical system having an f-θ characteristic, by which the drum surface is optically scanned and image recording is carried out thereby.

FIG. 14 is a schematic view of a main portion of such an optical scanning system.

In FIG. 14, a divergent light beam emitted from a light source means 141 is transformed into a parallel light beam by a collimator lens 142. After it is restricted by a stop 143, the light beam enters into a cylindrical lens 144 having a predetermined refractive power only in a sub-scan direction. As far as a main-scan sectional plane is concerned, the parallel light incident on the cylindrical lens 144 exits therefrom while keeping its state. As far as a sub-scan sectional plane concerns, the light beam is converged and imaged as a linear image upon a deflecting surface 145a of an optical deflector 145 that comprises a polygonal mirror.

The light beam deflected by the deflecting surface 145a of the optical deflector 145 is directed onto a photosensitive drum surface 148 as a scan surface to be scanned, by an imaging optical system 146 having an f-θ characteristic. By rotating the optical deflector 145 in a direction of an arrow A, the photosensitive drum surface 148 is optically scanned in a direction of an arrow B (main-scan direction), whereby imagewise data is recorded thereon.

In the optical scanning system described above, there is a synchronism detecting sensor (photodetector) 152 which is provided so as to adjust the timing of start of image formation on the photosensitive drum surface 148, prior to scan of the photosensitive drum surface 148 with the light spot. This synchronism detecting sensor 152 is arranged to receive a synchronism detection light beam which is a portion of the light beam scanningly deflected by the optical deflector 145, that is, a light beam that is scanning the region on the photosensitive drum 148 surface, outside the image forming region, before it scans the image forming region. This synchronism detection light beam is reflected by a synchronism detecting mirror 151 and, after being collected by a synchronism detecting lens (not shown), it is incident on the synchronism detecting sensor 152. On the basis of an output signal from this synchronism detecting sensor 152, a synchronism detection signal (synchronization signal) is detected and, based on this synchronism detection signal, the timing of starting the image recording on the photosensitive drum 148 surface can be adjusted.

The imaging optical system 146 of FIG. 14 is arranged so that, inside the sub-scan sectional plane, the deflecting surface 145a of the optical deflector 145 and the photosensitive drum surface 148 are placed in a conjugate relationship with each other. With this structure, any surface tilt of the deflecting surface 145a can be compensated.

In connection with optical scanning systems such as described above, printing machines having higher printing speed have been desired in recent years. For example, in regard to a color LBP, from the standpoint of printing speed, a tandem type printer wherein four photosensitive drums corresponding to four colors are scanned separately and images formed thereon are transferred to a transfer drum will be more desirable than a type wherein a single photosensitive drum is scanned four times and images formed thereon are transferred.

Furthermore, from the standpoint of saving the work space, compact optical scanning systems have been desired. Conventionally, to this end, a mirror or the like is used to bend the light path to thereby reduce the overall size of the optical scanning system.

On the other hand, further simplification (reduction of cost) has been desired in these years. That is, in many optical scanning systems, the cost of optical components such as a lens or a polygon mirror takes a large proportion to the whole of the apparatus. In an attempt to reducing the number of lenses and to lower the height of the polygon mirror, with respect to the sub-scan sectional plane the light beam is incident in an oblique direction to the deflecting surface of the polygon mirror. Then, the light beam passes a common imaging lens. With this structure, the number of lenses is reduced (Patent Document No. 1).

Furthermore, it is known that, in optical scanning systems, when left-hand side and right-hand side marginal rays with respect to the principal ray of the light beam are incident on the deflecting surface of a polygon mirror, there is a difference between them in regard to the incidence position. If the light is obliquely incident on the polygon mirror, the incidence height of marginal rays with respect to the principal ray is therefore different by an amount corresponding to the displacement of the deflecting surface.

This results in that, although the marginal rays of the deflected light have the same deflection angle in the sub-scan direction as of the principal ray, the height in the sub-scan direction is different between the left-hand side and right-hand side rays as shown in FIG. 15. Namely, the right rays are incident on the lens surface of the imaging lens 146 while being skewed. If such skew remains, wavefront aberration remains in a 45-degree direction and the imaged light spot is rotated thereby. In accordance with one proposal, in consideration of this, in a scanning system the angle between the marginal ray and the principal ray with respect to the sub-scan direction is changed to correct the skew, to thereby correct the spot rotation on the scan surface to be scanned (Patent Document No. 2).

[Patent Documents]
1. Japanese Laid-Open Patent Application, Publication No. 2002-365574
2. Japanese Laid-Open Patent Application, Publication No. 2004-70108

SUMMARY OF THE INVENTION

Recently, in many cases, imaging optical elements (lenses) used in optical scanning systems are resin mold products, because of better productivity or easiness of aberration correction. However, the shape of a resin product may change due to some fluctuation in regard to the production or any environmental change. If, for example, the curvature of a lens in the sub-scan direction changes, the skew having been corrected by designing could be deteriorated. This causes enlargement of the light spot on the scan surface, resulting in deterioration of the image quality.

It is accordingly an object of the present invention to provide an improved optical scanning system and an image forming apparatus using the same, by which excellent optical performance is obtainable with a compact and simple structure.

In accordance with an aspect of the present invention, there is provided an optical scanning system, comprising: light source means; an optical deflector having a deflecting surface, for scanningly deflecting a light beam emitted from said light source means; and an imaging optical system for imaging the light beam, deflected by said deflecting surface of said optical deflector, upon a scan surface to be scanned; wherein, when γ (γ≠0) refers to an angle which is defined, in a sub-scan sectional plane, between a principal ray of the light beam from said light source means and a normal to said deflecting surface of said optical deflector as the light beam is going to be incident on said deflecting surface, β refers to an imaging magnification of said imaging optical system with respect to a sub-scan direction, W [mm] refers to a light-beam width, in a main-scan direction, of a light beam that passes a light exit surface of an imaging optical element, of said imaging optical system, which element is closest to the scan surface, and ε (ε≠γ) refers to an angle defined, in the sub-scan sectional plane, between an optical axis of said imaging optical system and a straight line that connects a point of deflection of the light beam incident on said deflecting surface of said optical deflector and an imaging point of the light beam being imaged on the scan surface, a relation $$\frac{1+\beta}{\beta} \times |\tan(\gamma - \varepsilon)| \times W \leq 0.15 \; [\text{mm}]$$

is satisfied.

In accordance with another aspect of the present invention, there is provided an optical scanning system, comprising: light source means; an optical deflector having a deflecting surface, for scanningly deflecting a light beam emitted from said light source means; and an imaging optical system for imaging the light beam, deflected by said deflecting surface of said optical deflector, upon a scan surface to be scanned; wherein, when γ (γ≠0) refers to an angle which is defined, in a sub-scan sectional plane, between a principal ray of the light beam from said light source means and a normal to said deflecting surface of said optical deflector as the light beam is going to be incident on said deflecting surface, β refers to an imaging magnification of said imaging optical system with respect to a sub-scan direction, W [mm] refers to a light-beam width, in a main-scan direction, of a light beam that passes a light exit surface of an imaging optical element, of said imaging optical system, which element is closest to the scan surface, and ε (ε≠γ) refers to an angle defined, in the sub-scan sectional plane, between an optical axis of said imaging optical system and a straight line that connects a point of deflection of the light beam incident on said deflecting surface of said optical deflector and an imaging point of the light beam being imaged on the scan surface, and where an amount of change Δds of field curvature ds, in the sub-scan direction, with a positional change Δy at a scan position y in the main-scan direction on the scan surface is denoted by Δds/Δy, a relation $$\frac{1+\beta}{\beta} \times |\tan(\gamma - \varepsilon)| \times W \times \left|\frac{\Delta ds}{\Delta y}\right| \leq 0.004 \; [\text{mm}]$$

is satisfied.

In one preferred form of the present invention, the imaging magnification β of said imaging optical system in the sub-scan direction may satisfy the following condition:

$$1.0 \leq |\beta s| \leq 3.0$$

In one preferred form of the present invention, the angle γ defined, in a sub-scan sectional plane, between the principal ray of the light beam from said light source means and the normal to said deflecting surface of said optical deflector as the light beam is going to be incident on said deflecting surface, may satisfy the following condition:

$$1.5(\text{deg.}) \leq \gamma \leq 3.5(\text{deg.})$$

In accordance with a further aspect of the present invention, there is provided an image forming apparatus, comprising: an optical scanning system as recited above; a photosensitive material disposed at a scan surface to be scanned; a developing device for developing an electrostatic latent image formed on said photosensitive material through a light beam scanned by said optical scanning system, to produce a toner image; a transferring device for transferring the developed toner image onto a transfer material; and a fixing device for fixing the transferred toner image, on the transfer material.

In accordance with a still further aspect of the present invention, there is provided an image forming apparatus, comprising: an optical scanning system as recited in above; and a printer controller for converting code data supplied from an outside machine into an imagewise signal and for inputting the imagewise signal into said optical scanning system.

In accordance with a yet further aspect of the present invention, there is provided a color image forming apparatus, comprising: a plurality of optical scanning systems each being as recited above; and a plurality of image bearing members disposed at scan surfaces, respectively, to be scanned by said optical scanning system, respectively, for forming images of different colors.

In one preferred form of this aspect of the present invention, the color image forming apparatus may further comprise a printer controller for converting a color signal supplied from an outside machine into imagewise data of different colors and for inputting the imagewise data into corresponding optical scanning systems.

Briefly, in accordance with the present invention, an optical scanning system having excellent optical performance even with a compact and simple structure as well as an image forming apparatus having such optical scanning system are accomplished.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
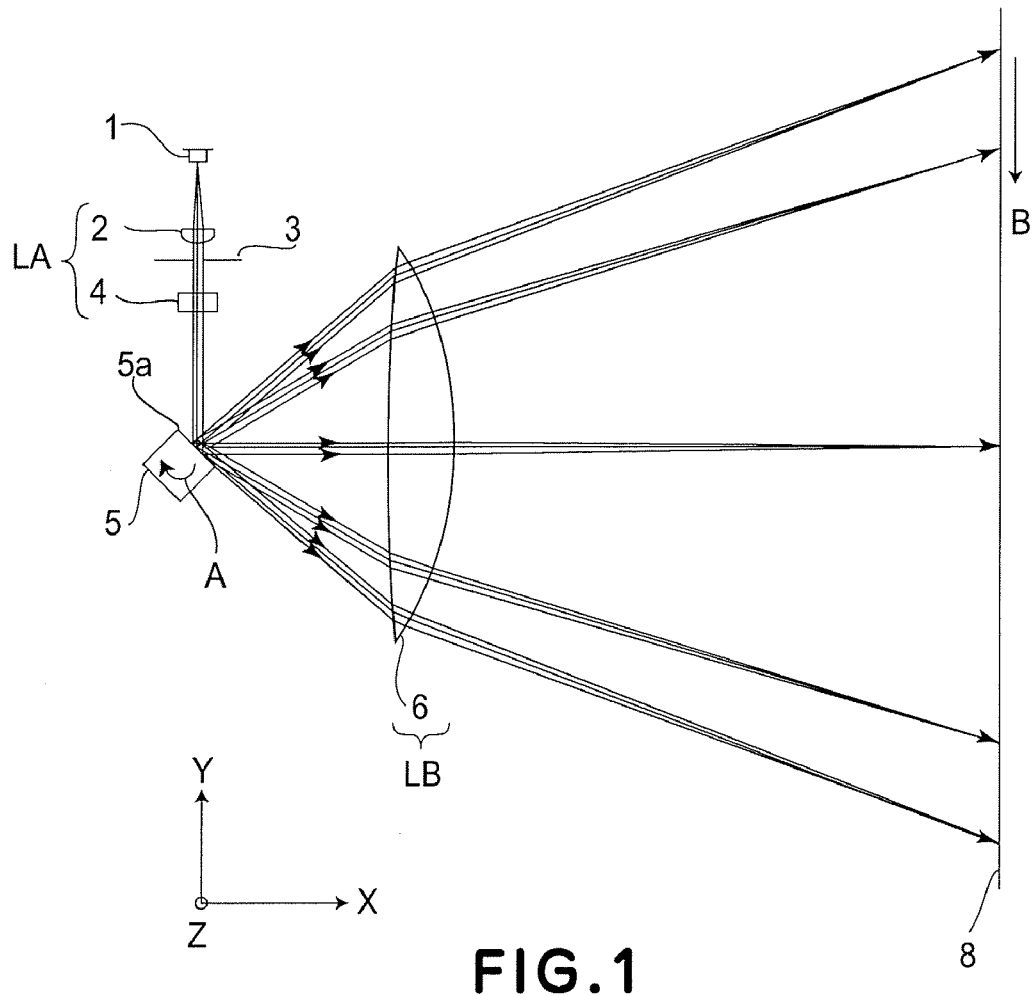
FIG. 1 is a sectional view, in a main-scan sectional plane, of a first embodiment of the present invention.

FIG. 1 is a sectional view along a main-scan direction (main-scan sectional plane) of a main portion of an optical scanning system according to a first embodiment of the present invention.

In this specification, the term "main-scan direction" refers to a direction which is perpendicular to the rotational axis of a rotary polygonal mirror and to the optical axis of an imaging optical system (that is, a direction in which a light beam is deflected (deflectively scanned) by the rotary polygonal mirror). The term "sub-scan direction" refers to a direction which is parallel to the rotational axis of the rotary polygonal mirror. The term "main-scan sectional plane" refers to a plane that contains the main-scan direction and the optical axis of the imaging optical system. The term "sub-scan sectional plane" refers to a plane which is perpendicular to the main-scan sectional plane.

In FIG. 1, denoted at 1 is a light source means which may comprise a semiconductor laser, for example. Denoted at 2 is a condenser lens (collimator lens) as a collecting optical system. Denoted at 3 is an aperture stop having a function for restricting light passing therethrough and for regulating the beam shape.

Denoted at 4 is a lens system (cylindrical lens) having a predetermined power only in the sub-scan sectional plane. It serves to image, in the sub-scan sectional plane, the light beam passed through the condensing lens 2, into a linear image on the deflecting surface (deflecting surface) 5a of the optical deflector 5 which will be described later.

The function of the condenser lens 2 and the cylindrical lens 4 may be provided by a single optical element. Here, the condenser lens 2, the aperture stop 3 and the cylindrical lens 4 are components of an input optical system LA.

Denoted at 5 is the optical deflector which comprises a polygonal mirror (rotary polygon) with four mirror surfaces. The polygonal mirror 5 can be rotated by driving means such as a motor (not shown) in a direction of an arrow A in the drawing and at a constant speed.

Denoted at LB is an imaging optical system having a light collecting function and an f-θ characteristic. It comprises a single imaging lens (anamorphic lens) 6, and functions to image the light beam, reflectively deflected by the optical deflector 5 and based on imagewise information, in the main-scan sectional plane and as a light spot upon the surface of a photosensitive drum surface (scan surface to be scanned) 8. The imaging lens 6 has a function for providing an optically conjugate relationship, in the sub-scan sectional plane, between the deflecting surface 5a of the optical deflector 5 and the photosensitive drum surface 8, to thereby compensate any surface tilt of the deflecting surface.

Denoted at 8 is the photosensitive drum surface as the surface to be scanned.

In this embodiment, the light beam emitted from the semiconductor laser 1 enters the condenser lens 2 by which it is transformed into a parallel light beam. Then, while the light beam (light quantity) is restricted by the aperture stop 3, the parallel light enters the cylindrical lens 4. As far as the main-scan sectional plane is concerned, the parallel light incident on the cylindrical lens 4 exits therefrom while keeping its state. As far as the sub-scan sectional plane concerns, the light beam is imaged as a linear image (linear image elongating in the main-scan direction) upon the deflecting surface 5a of the optical deflector 5.

Here, the light beam to be incident on the deflecting surface 5a is projected from the sub-scan sectional plane, that contains the rotational axis of the optical deflector 5 and the optical axis of the imaging optical system 6, in an oblique direction (from below) with a finite angle (γ=1.5 deg.) with respect to a plane (plane of rotation of the optical deflector 5) which is perpendicular to the rotational axis of the optical deflector 5. With this arrangement, the input light beam and the deflected light beam are separated from each other (oblique incidence optical system).

The incidence angle γ is defined as being the angle which is formed, in the sub-scan sectional plane, between the chief ray of the light beam incident on the deflecting surface 5a of the optical deflector 5 and a normal to that deflecting surface 5a.

The light beam deflectively scanned by the deflecting surface 5a of the optical deflector 5 is imaged by the imaging lens 6 upon the photosensitive drum surface 8 into a spot-like shape. By rotating the optical deflector 5 in the direction of an arrow A, the photosensitive drum surface 8 is optically scanned in the direction of an arrow B (main scan direction) at a constant speed. By this, imagewise recording is carried out on the photosensitive drum surface 8 as a recording medium.

Figure 2:
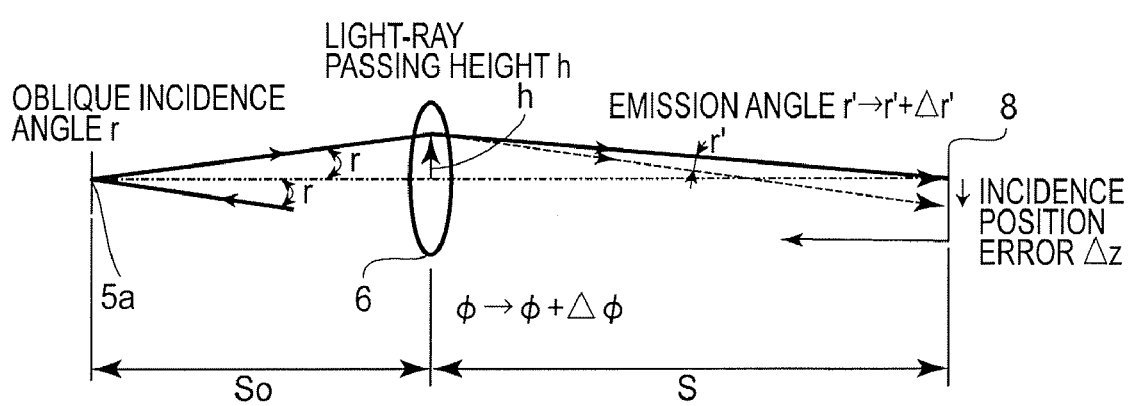
FIG. 2 is a schematic view for explaining, in terms of paraxial, an imaging optical system according to the first embodiment of the present invention.

FIG. 2 is a sectional view schematically showing the sub-scan section of the first embodiment of the present invention. In FIG. 2, the elements corresponding to those shown in FIG. 1 are denoted by like numerals.

As described hereinbefore, the imaging lens 6 of this embodiment is arranged to provide a conjugate relationship between the deflecting surface 5a and the scan surface 8 so as to compensate any surface tilt of the deflecting surface 5a of the polygonal mirror 5.

Here, the incidence angle in the sub-scan sectional plane as the light beam from the light source means 1 is incident on the deflecting surface of the polygonal mirror is denoted by $\gamma$. Also, the power of the imaging lens 6 in the sub-scan direction is denoted by $\phi$, the imaging magnification of the imaging lens 6 in the sub-scan direction is denoted by $\beta$, and the height of the light ray, in the sub-scan direction, being incident on the imaging lens 6 is denoted by h. Furthermore, the emission angle of the imaging lens 6 is denoted by $\gamma'$ ($=\gamma/\beta$). Then, the amount of change $\Delta\gamma'$ in the emission angle as the power of the imaging lens 6 changes by $\Delta\phi$ due to fluctuation in the production or to any environmental change, can be determined by paraxial calculation, as follows.

$$\Delta\gamma' = h \cdot \Delta\phi \qquad \text{Equation (A)}$$

When the distance to the imaging lens 6 from the deflecting point on the deflecting surface 5a of the polygonal mirror 5 is denoted by $S_0$, and the distance to the scan surface 8 from the imaging lens 6 is denoted by S, a change $\Delta z$ in scan position (deviation of irradiated position) on the scan surface 8 to be caused by a change in the power of the imaging lens 6 in the sub-scan direction, can be expressed by $$\Delta z = \Delta\gamma' \times S \qquad \text{Equation (B)}$$

If Equation (A) is combined with $h = S_0 \times \gamma$, Equation (B) can be rewritten as $$\Delta z = S_0 \times S \times \gamma \times \Delta\phi \qquad \text{Equation (C)}$$

If a change of the power of the imaging lens 6 by $\Delta\phi$ in the sub-scan direction causes a change $\Delta S$ of the focus upon the scan surface 8 in the sub-scan direction, $\Delta\phi$ can be expressed as follows.

$$\Delta\phi = \frac{1}{S + \Delta S} - \frac{1}{S} \doteq \frac{\Delta S}{S^2} \qquad \text{Equation (D)}$$

Thus, from Equation (C) and Equation (D), $\Delta z$ can be expressed as follows.

$$\Delta z = \frac{S_0}{S} \times \Delta S \times \gamma = \frac{\gamma}{\beta} \times \Delta S \qquad \text{Equation (E)}$$

Figure 3:
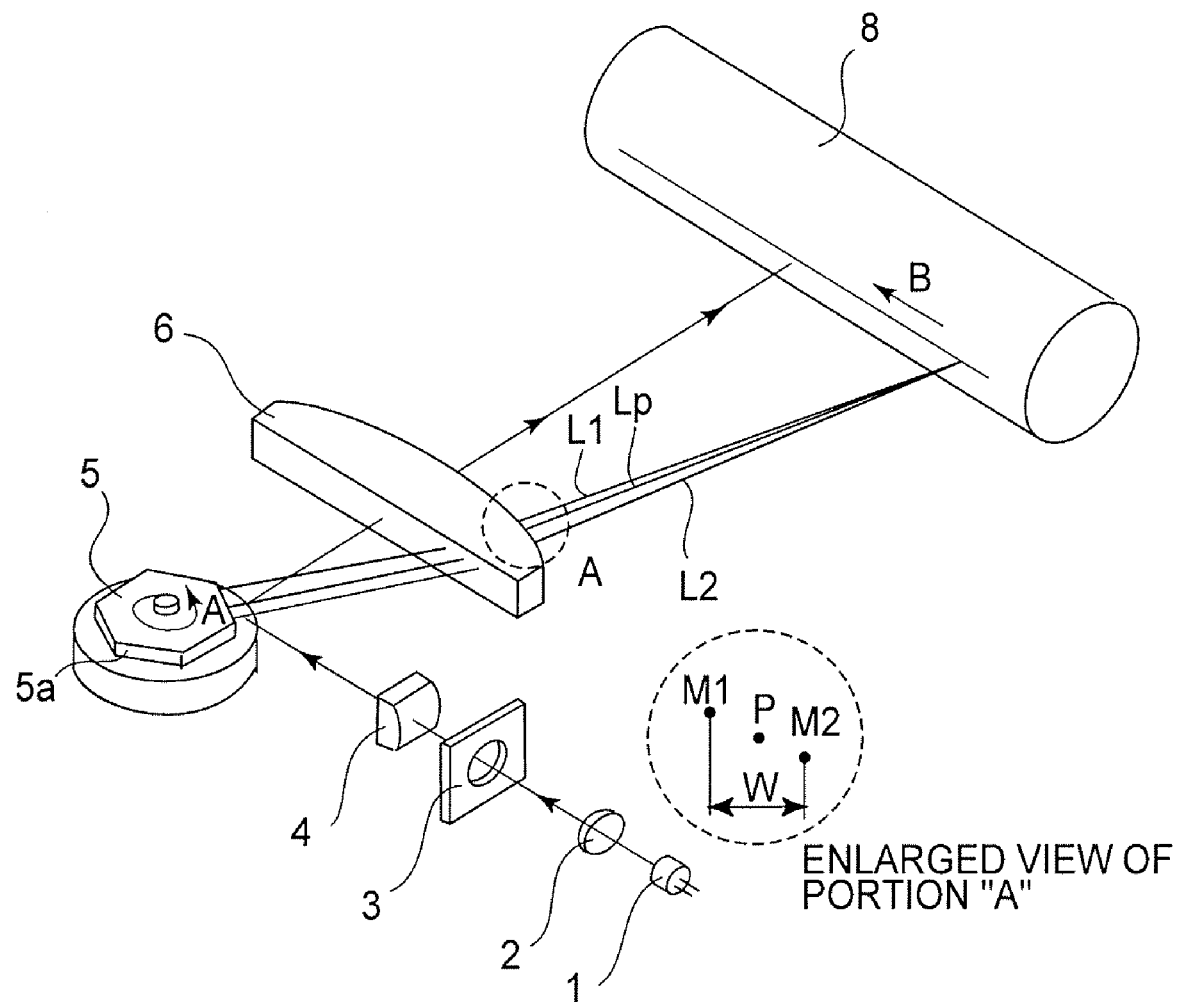
FIG. 3 is a schematic view for explaining the principal ray and marginal rays that pass through the optical system in the first embodiment of the present invention.

FIG. 3 is a perspective view of a main portion of the optical scanning system. A circular area A depicted by a broken line in FIG. 3 illustrates the state of emission of light rays on the plane which is at the light exit side of the imagine lens 6.

As shown in the drawing, the position where the principal ray Lp of the light beam deflected by the polygon mirror 5 passes through the imaging lens is denoted by P, and the positions where the left-hand side and right-hand side marginal rays L1 and L2 pass through the imaging lens 6 are denoted by M1 and M2, respectively. If the powers $\phi_P$, $\phi_{M1}$ and $\phi_{M2}$ at the respective passage positions in the sub-scan direction change individually, a difference is caused thereby in their imaging positions $\Delta S_P$, $\Delta S_{M1}$ and $\Delta S_{M2}$ and, as a result, skew is produced on the scan surface 8. The amount of skew can be determined by calculating the difference between the marginal rays. From Equation (E), if the skew amounts of the marginal rays L1 and L2 are denoted by $\Delta Z_{M1}$ and $\Delta Z_{M2}$, it can be determined by the following equation.

$$\text{Skew Amount} = \Delta z_{M1} - \Delta z_{M2} \qquad \text{Equation (F)}$$
$$= \frac{\gamma}{\beta} \times (\Delta S_{M1} - \Delta S_{M2})$$

If the light-beam width between the passage positions M1 and M2, in the main-scan direction, of the marginal ray passing through the light exit surface of the imaging lens 6 is dented by W [mm] as shown in FIG. 3, and where the amount of change $\Delta ds$ of field curvature ds in the sub-scan direction with respect to a positional change $\Delta y$ at the scan position y on the scan surface 8 in the main-scan direction is denoted by $\Delta ds/\Delta y$, the difference in focus change between the marginal rays is expressed as follows.

$$\Delta S_{M1} - \Delta S_{M2} = \frac{\Delta ds}{\Delta y} \times (1 + \beta) \times W \qquad \text{Equation (G)}$$

From Equation (F) and Equation (G), the skew amount $z_i$ can be expressed as follows.

$$z_i = \left(1 + \frac{1}{\beta}\right) \times \gamma \times W \times \left|\frac{\Delta ds}{\Delta y}\right| \qquad \text{Equation (H)}$$

It is seen from this equation that, if the focus change due to any fluctuation in the manufacture or to environmental change occurs locally, the skew could be deteriorated to cause spot rotation (torsion of wavefront aberration) and enlargement of the spot diameter, such that the image quality would be degraded.

Figure 4:
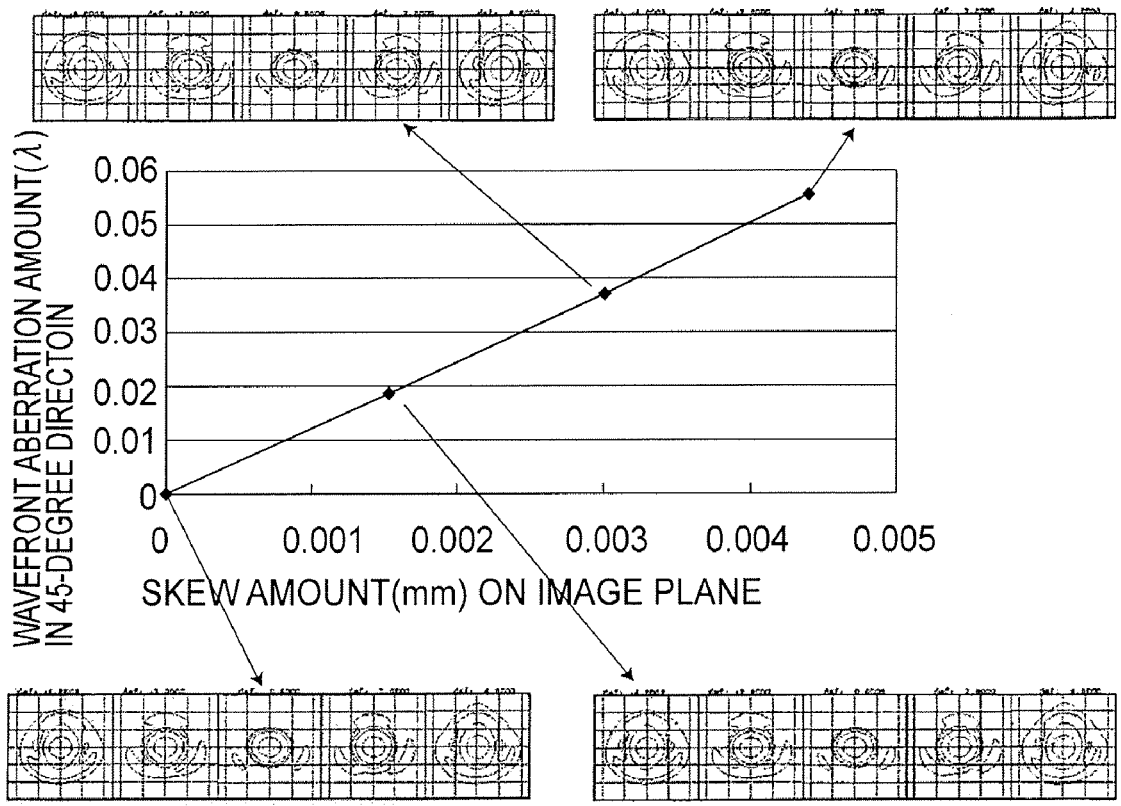
FIG. 4 is a correlation diagram for explaining the correlation among skew amount, wavefront aberration in the 45-degree direction and spot rotation, on the scan surface, in the first embodiment of the present invention.
Figure 5:
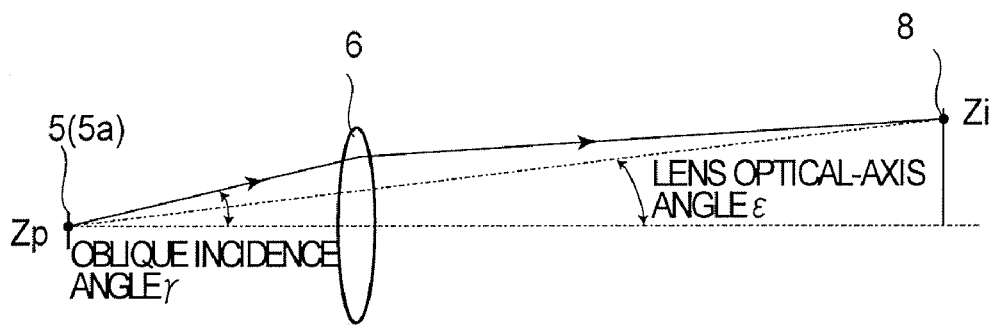
FIG. 5 is a sectional view, in a sub-scan sectional plane, of a non-coaxial imaging optical system in the first embodiment of the present invention.

FIG. 4 illustrates the relationship between the skew amount on the scan surface 8 and the wavefront aberration in the 45-degree direction, as well as spot rotation as the light beam is defocused on the scan surface 8.

Generally, if the wavefront aberration in the 45-degree direction becomes equal to or more than $0.04\lambda$, spot rotation as the light beam is defocused on the scan surface 8 becomes notable and it leads to a decrease of the depth of focus. Thus, in order to keep the wavefront aberration in the 45-degree direction not greater than $0.04\lambda$, it is seen from FIG. 4 that the skew amount $\Delta z_i$ should be maintained at a level not greater than 0.003 mm.

This embodiment uses an oblique incidence optical system wherein, in the sub-scan sectional plane, the light beam incident on the deflecting surface 5a of the polygon mirror 5 is being projected in an oblique direction with respect to a normal to the deflecting surface 5a of the polygon mirror 5.

In such oblique incidence optical system, in order to reduce the height of the polygon mirror 5, the heights of light beams (light rays) incident on the deflecting surface 5a of the polygon mirror 5 are central with respect to the deflecting surface 5a. However, for easy separation of the light rays, in many cases the light rays after passing the imaging lens 6 are held spread.

In such case, in the sub-scan sectional plane, the height of the imaging point (incidence position) Zi of the light beam imaged on the scan surface 8 is different from the height of the deflecting point (incidence position) Zp of the light beam incident on the deflecting surface 5a of the polygon mirror 5.

It can be concluded therefore that, in regard to the conjugate relationship in the oblique incidence model described above, a straight line that connects the deflecting point (incidence position) Zp of the light beam incident on the deflecting surface 5a of the polygon mirror 5 and the imaging point (incidence position) Zi of the light beam imaged on the scan surface 8 should be taken as a reference axis. Hence, an oblique incidence model based on $|\gamma-\epsilon|$ will now be considered, using an angle $\epsilon$ ($\epsilon \neq \gamma$) defined in the sub-scan sectional plane between the straight line mentioned above and the optical axis of the imaging optical system which optical axis is perpendicular to the rotational axis of the polygon mirror 5.

Hence, in order to suppress the skew to be produced by focus change in the sub-scan direction due to any fluctuation in regard to manufacture or any environmental change, the following condition should preferably be satisfied.

$$\frac{1+\beta}{\beta} \times |\tan(\gamma - \varepsilon)| \times W \times \left|\frac{\Delta ds}{\Delta y}\right| \le 0.004 \; [\text{mm}]. \quad \text{Equation (2)}$$

It is now assumed that a focus change $|\Delta ds/\Delta y|$ of an amount 0.02 (mm/mm) has occurred. Then, the optical system should preferably be set so that "$[(1+\beta)/\beta] \times |\tan(\gamma-\epsilon)| \times W$" at the left-hand side of Equation (2) satisfies the following condition.

$$\frac{1+\beta}{\beta} \times |\tan(\gamma - \varepsilon)| \times W \le 0.15 \; [\text{mm}] \quad \text{Equation (1)}$$

Equation (1) and Equation (2) above are conditions for suppressing the skew amount. If the conditions of Equation (1) and Equation (2) are unsatisfied, inconveniently it is difficult to suppress the skew amount to be produced by focus change in the sub-scan direction due to any fluctuation in regard to manufacture or any environmental change.

More preferably, Equation (1) and Equation (2) above should be set as follows.

$$0.01 \; [\text{mm}] \le \frac{1+\beta}{\beta} \times |\tan(\gamma - \varepsilon)| \times W \le 0.14 \; [\text{mm}] \quad \text{Equation (1a)}$$

$$0.0001 \; [\text{mm}] \le \frac{1+\beta}{\beta} \times |\tan(\gamma - \varepsilon)| \times W \times \left|\frac{\Delta ds}{\Delta y}\right| \le 0.003 \; [\text{mm}] \quad \text{Equation (2a)}$$

It is seen that if in Equation (1) and Equation (2) the oblique incidence angle in the sub-scan direction is the same, the amount of change of skew becomes sensitive when the sub-scan magnification $\beta$ becomes less than 1. Furthermore, if the sub-scan magnification $\beta$ is too large, the focus sensitivity in the sub-scan direction responsive to a change in shape increases. In consideration of these, the sub-scan magnification $\beta$ of the imaging optical system should preferably satisfy the following condition.

$$1.0 \le |\beta s| \le 3.0 \quad \text{Equation (3)}$$

More preferably, Equation (3) above should be set as follows.

$$1.2 \le |\beta s| \le 2.8 \quad \text{Equation (3a)}$$

Furthermore, if the oblique incidence angle $\gamma$ is small, inconveniently it becomes difficult to separate the light beams after they emerge from the imaging optical system. Thus, the oblique incidence angle $\gamma$ should preferably be satisfy the following condition.

$$1.5(\text{deg.}) \le \gamma \quad \text{Equation (4)}$$

More preferably, Equation (4) should be set as follows.

$$1.5(\text{deg.}) \le \gamma \le 3.5(\text{deg.}) \quad \text{Equation (4a)}$$

Furthermore, with regard to the light-beam width W [mm] in the main-scan direction from the passage position M1 to the passage position M2 of the marginal rays, passing through the light exit surface of the imaging lens 6, from the standpoint of reducing the size of the spot diameter in the main-scan direction, the following condition should preferably be satisfied.

$$1 \; \text{mm} \le W$$

Moreover, from the standpoint of keeping the depth of focus in the main-scan direction, W [mm] should preferably satisfy the following condition.

$$W \le 5 \; \text{mm}$$

Figure 6A:
FIG. 6A is a sectional view, in the sub-scan sectional plane, of the first embodiment of the present invention.
Figure 6B:
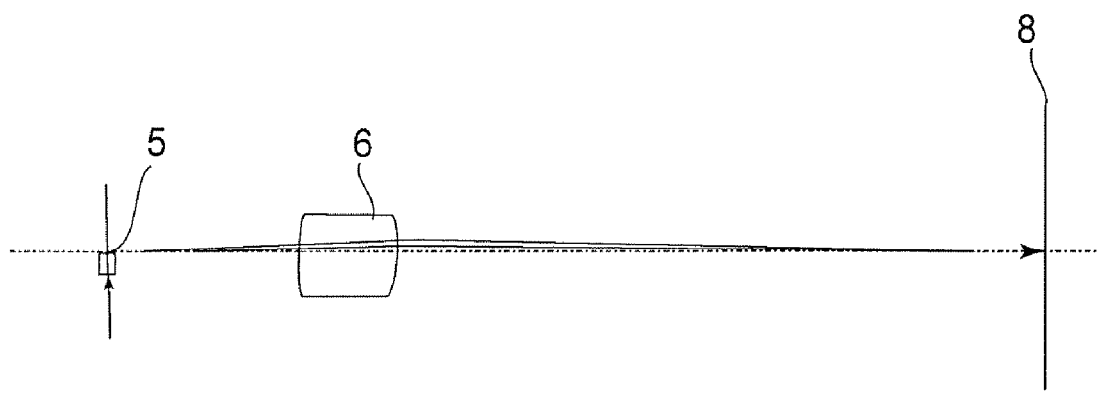
FIG. 6B is a sectional view, in the sub-scan sectional plane, of a conventional optical scanning system.

FIG. 6A is a sectional view, in the sub-scan sectional plane, of the optical system from the polygon mirror 5 to the scan surface in the first embodiment of the present invention. FIG. 6B shows a comparative example and illustrates a sectional view, in the sub-scan sectional plane, of a conventional optical system from the polygon mirror 5 to the scan surface. Further, Table 1 below shows numerical values of a scanning optical system according to the first embodiment of the present invention. Table 2 below shows numerical values of a conventional scanning optical system.

It is seen from FIGS. 6A and 6B that, although in the conventional optical system the light beam is collected at the lens axis, in the optical system of this embodiment the light beam is collected at a position 2.3 mm from the lens axis (center of the scan surface). Hence, in this embodiment, the light collecting position differs from that of the conventional structure. Furthermore, in this embodiment, the curvature in the sub-scan direction changes with the position in the main-scan direction and, by bending the apexes of respective curvatures with respect to the meridional line, the spot rotation due to oblique incidence is corrected.

TABLE 1

| Used Wavelength | λ (nm) | 790 |
| --- | --- | --- |
| Sub-Scan Oblique Incidence Angle | γ (deg) | 2.0 |
| Anamorphic Lens Refractive Index | n1 | 1.52781 |
| Distance from Deflection Surface to Anamorphic Lens | d1 (mm) | 40.00 |
| Anamorphic Lens Center Thickness | d2 (mm) | 20.00 |
| Distance from Anamorphic Lens to Scan Surface | d3 (mm) | 132.80 |
| f-θ Coefficient | f | 134.00 |

TABLE 1-continued

| | Anamorphic Lens Shape | |
|---|---|---|
| | 1st Surface | 2nd Surface |
| R | 662.521 | −78.995 |
| r | 62.152 | −25.420 |

TABLE 2

| Used Wavelength | λ (nm) | 790 |
|---|---|---|
| Sub-Scan Oblique Incidence Angle | γ (deg) | 2.0 |
| Anamorphic Lens Refractive Index | n1 | 1.52781 |
| Distance from Deflection Surface to Anamorphic Lens | d1 (mm) | 40.00 |
| Anamorphic Lens Center Thickness | d2 (mm) | 20.00 |
| Distance from Anamorphic Lens to Scan Surface | d3 (mm) | 132.80 |
| f-θ Coefficient | f | 136.00 |

| | Anamorphic Lens Shape | |
|---|---|---|
| | 1st Surface | 2nd Surface |
| R | 342.790 | −88.631 |
| r | infinite | −20.170 |

Figure 7A:
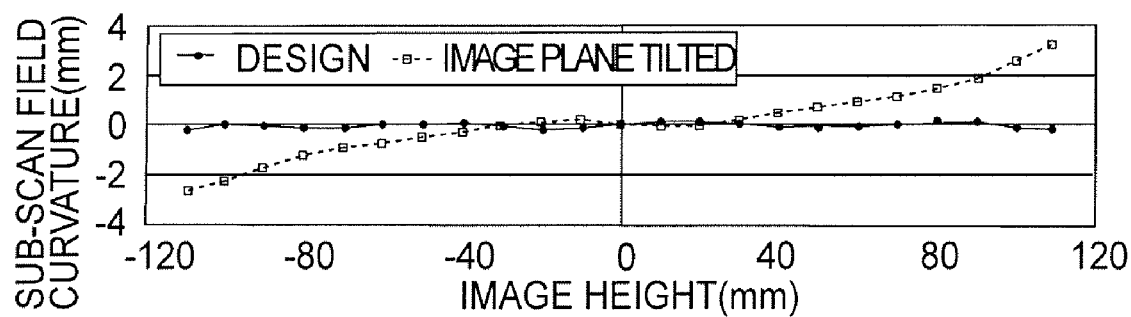
FIGS. 7A-7C are illustrations for explaining field curvature in the first embodiment of the present invention, and spots on the scan surface as the field curvature is tilted.
Figure 7B:
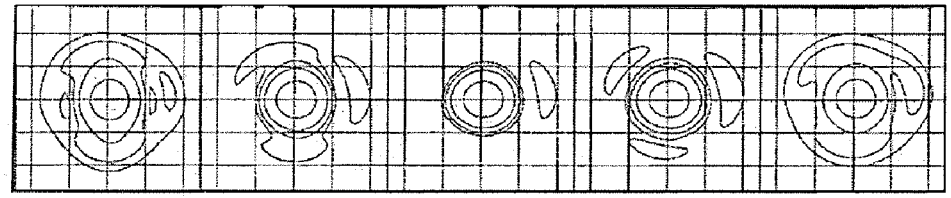
Figure 7C:
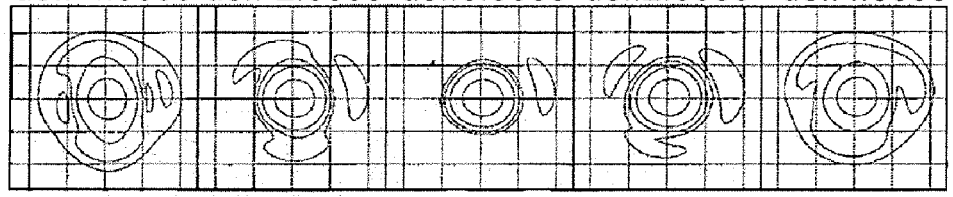

It is now assumed that, due to a change in shape of the imaging lens in the sub-scan direction, a field curvature change $|\Delta ds/\Delta y|$ of an amount 0.02 (mm/mm) in the sub-scan direction has occurred as shown in FIG. 7A, for example. FIG. 7B illustrates the design spot shape on the scan surface at an image height 110 mm of the end portion of the effective image region. FIG. 7C illustrates the spot shape as the scan surface has changed by a particular amount.

Figure 8A:
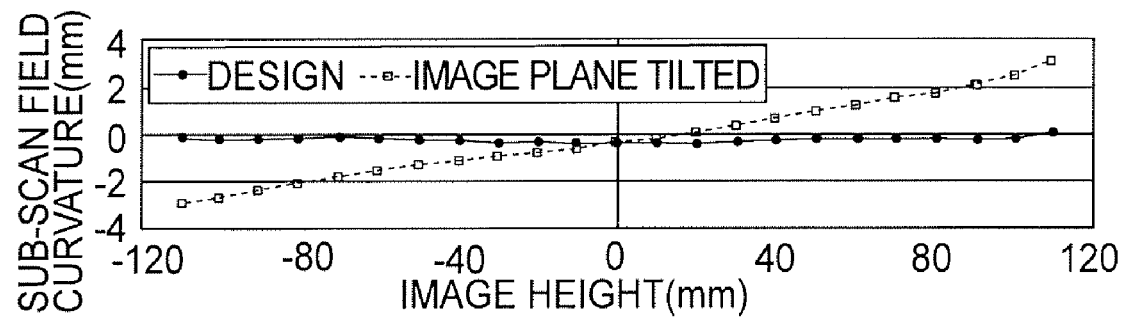
FIGS. 8A-8C are illustrations for explaining field curvature in a prior art example, and spots on the scan surface as the field curvature is tilted.
Figure 8B:
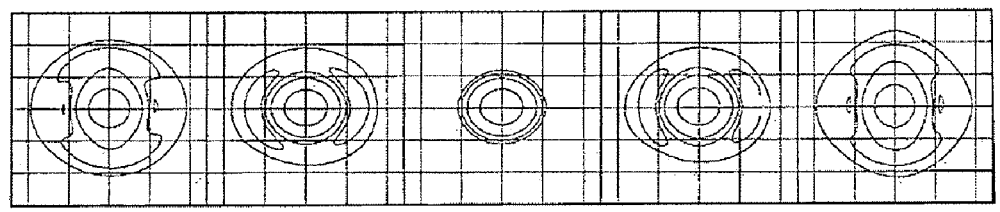
Figure 8C:
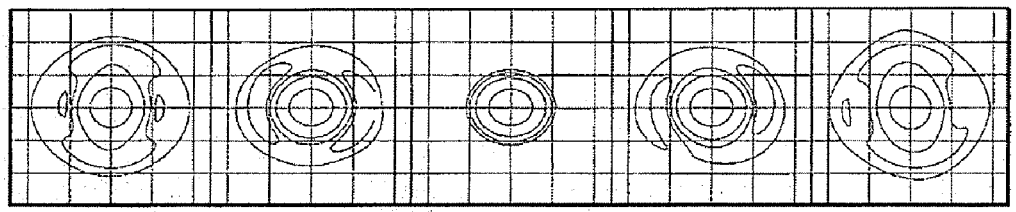

Similarly, in regard to the conventional structure, assuming that a field curvature change $|\Delta ds/\Delta y|$ of an amount 0.02 (mm/mm) in the sub-scan direction has occurred as shown in FIG. 8A due to a change in shape of the imaging lens in the sub-scan direction, FIG. 8B illustrates the design spot shape on the scan surface at an image height 110 mm of the end portion of the effective image region and FIG. 8C illustrates the spot shape as the scan surface has changed by a particular amount.

Comparing this embodiment and the conventional structure, it is seen that, although the change of field curvature is the same, the amount of spot rotation on the scan surface is smaller in this embodiment than in the conventional structure.

When "$(1+1/\beta) \times \tan|(\gamma-\epsilon)| \times W$" at the left-hand side of Equation (1) is calculated, in regard to the conventional structure, the results are as follows.

$\beta=2.5$
$\gamma=3.0$
$\epsilon=0.0$
$W=4.4$ mm

It follows from this that $(1+1/\beta) \times \tan|(\gamma-\epsilon)| \times W = 0.31$ (mm)

This does not satisfy the condition of Equation (1). As compared therewith, in accordance with this embodiment of the present invention, the results are as follows.

$\beta=2.7$
$\gamma=2.0$
$\epsilon=0.77$
$W=4.4$ mm

It follows from this that $(1+1/\beta) \times \tan|(\gamma-\epsilon)| \times W = 0.13$ (mm)

This satisfies the condition of Equation (1). Furthermore, the left-hand side of Equation (2) is equal to 0.0026 (mm), and this satisfies the condition of Equation (2). It is seen from this that the structure of this embodiment effectively suppresses spot rotation even if field curvature occurs.

Generally, if the oblique incidence angle with respect to the deflecting surface 5a is large, due to non-uniform eccentricity of plural deflecting surfaces there will occur jitter in the sub-scan direction (i.e. a deviation of the imaging position on the scan surface in the sub-scan direction). Thus, by using the structure as of the present embodiment wherein the oblique incidence angle γ and the angle ε are made small, in an occasion where the invention is applied to a color image forming apparatus having a plurality of optical scanning systems, separation of light beams to plural photosensitive drums can be done very easily. Additionally, the oblique incidence angle γ can be made smaller, such that sub-scan jitter due to non-uniform eccentricity of the deflecting surfaces can be reduced.

It should be noted here that, although in this embodiment the light source means has a single light emitting device (light emission point), the present invention is not limited to this. A plurality of light emitting devices that provides a plurality of light beams may be used.

Furthermore, although in this embodiment a light beam which emerges from the light source means with a finite angle in the main-scan sectional plane with respect to the optical axis of the imaging optical system is incident on the deflecting surface of the polygon mirror, the present invention is not limited to this.

Namely, in the present invention, a light beam emitted from the light source means may be projected, in the main-scan sectional plane, upon the deflecting surface of the polygon mirror along the optical axis direction of the imaging optical system (front incidence optical system).

[Color Image Forming Apparatus]

Figure 9A:
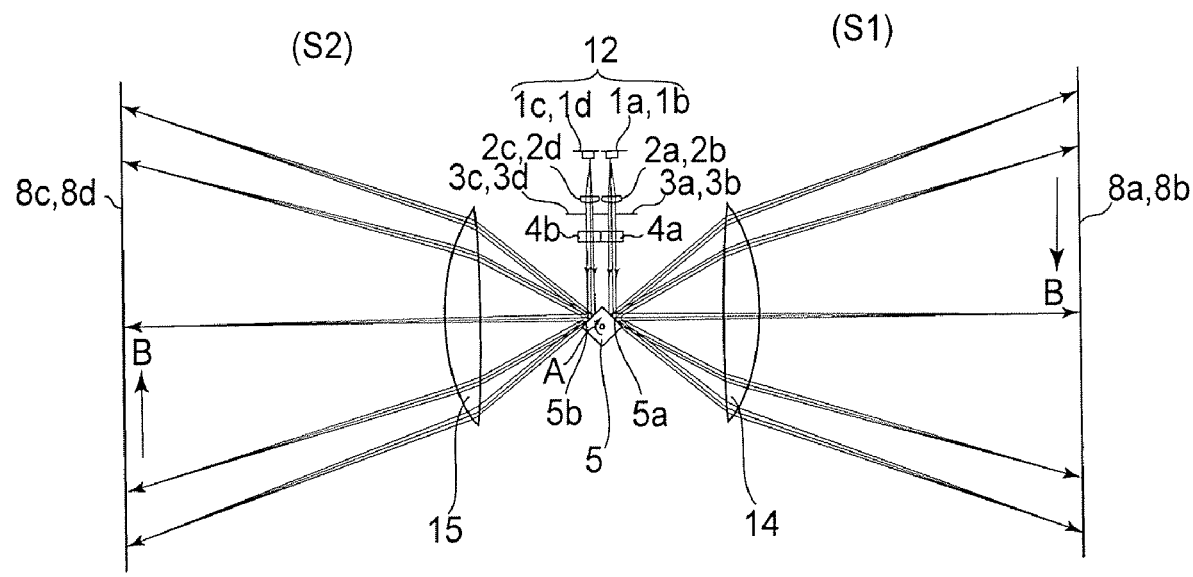
FIGS. 9A and 9B are sectional views, in the main-scan sectional plane and in the sub-scan sectional plane, respectively, of an oblique-incidence tandem system in the first embodiment of the present invention.
Figure 9B:
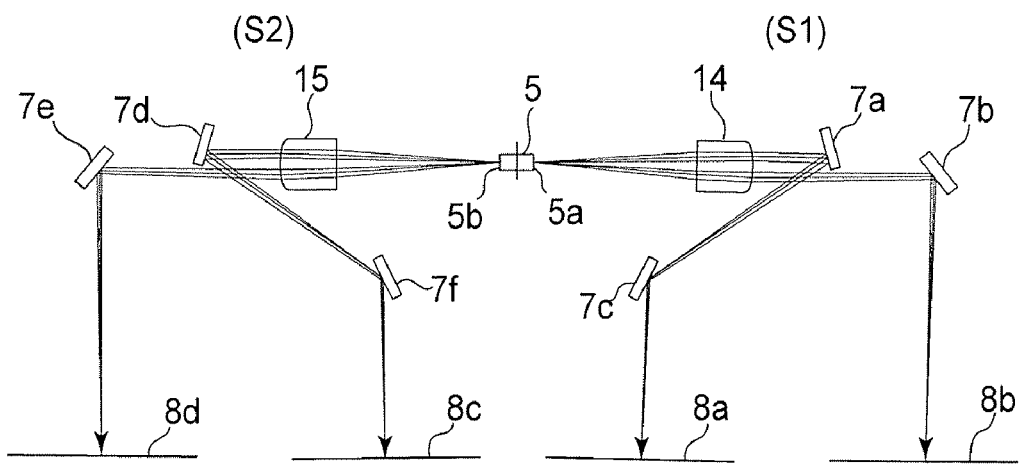

FIGS. 9A and 9B are sectional views of a main portion of an optical scanning system in a tandem type color image forming apparatus, having two optical scanning systems each being as shown in FIG. 1, wherein a single optical deflector is used for both of them. FIG. 9A is a main-scan sectional plane view, and FIG. 9B is a sub-scan sectional plane view. As shown in FIGS. 9A and 9B, in this example, two light beams are incident on each of two imaging optical systems 14 and 15 and four light beams are incident on a common (single) optical deflector 5 simultaneously. The four light beams are deflected by the common optical deflector 5, by which four photosensitive drums 8a, 8b, 8c and 8d corresponding to the four light beams are optically scanned.

In FIGS. 9A and 9B, denoted at S1 and S2 are first and second stations (scanning units) which are disposed at opposite sides of the optical deflector 5. Denoted at 12 is a light source means that may comprise four semiconductor lasers 1a, 1b, 1c and 1d each providing a single light beam. Four divergent light beams emitted from the four semiconductor lasers 1a-1d are transformed into parallel light beams by means of associated four collimator lenses 2a, 2b, 2c and 2d, respectively. Thereafter, by means of associated aperture stops 3a, 3b, 3c and 3d, the light beam width is restricted.

The parallel light beams passed through the aperture stops 3a and 3b are imaged on the deflecting surface 5a of the optical deflector 5, by means of a first cylindrical lens 4a having a power only in the sub-scan direction, each into a linear image elongating in the main-scan direction. On the other hand, the parallel light beams passed through the aperture stops 3c and 3d are imaged on the deflecting surface 5b of the optical deflector 5, by means of a second cylindrical lens 4b having a power only in the sub-scan direction, each into a linear image elongating in the main-scan direction.

Denoted at 5 is the optical deflector as a deflecting means and it may comprise a polygon mirror (rotary polygonal mirror) having four mirror surfaces, for example. It can be rotated in the direction of an arrow A in the drawing at a constant angular speed, by driving means such as a motor (not shown).

Denoted at 14 and 15 are first and second imaging optical systems (f-θ lens systems) having a light collecting function and an f-θ characteristic. Each of these imaging optical systems may comprise a single toric lens (imaging optical element) made of plastic resin and having different refractive powers with respect to the main-scan direction and the sub-scan direction. Each of the first and second imaging optical systems 14 and 15 function to image two light beams scanningly deflected by the optical deflector 5 and based on imagewise information, upon the photosensitive drum surfaces 8a and 8b (or 8c and 8d) as scan surfaces. Furthermore, with respect to the sub-scan sectional plane, there is a conjugate relationship between the deflecting surface 5a (5b) of the optical deflector 5 and the photosensitive drum surfaces 8a and 8b (8c and 8d) and, with this arrangement, any surface tilt of the deflecting surface can be compensated.

The four light beams scanningly deflected by the deflecting surfaces 5a and 5b of the optical deflector 5 are directed through the first imaging optical system 14 or the second imaging optical system 15, respectively to the photosensitive drum surfaces 8a, 8b, 8c and 8d corresponding to these four light beams, respectively. Then, by rotating the optical deflector 5 in the direction of an arrow A, the photosensitive drum surfaces 8a-8d are optically scanned in the direction of an arrow B. By this, a single scan line is defined on each of the photosensitive drum surfaces 8a-8d and, in this manner, image recording is carried out.

Embodiment 2

Figure 10A:
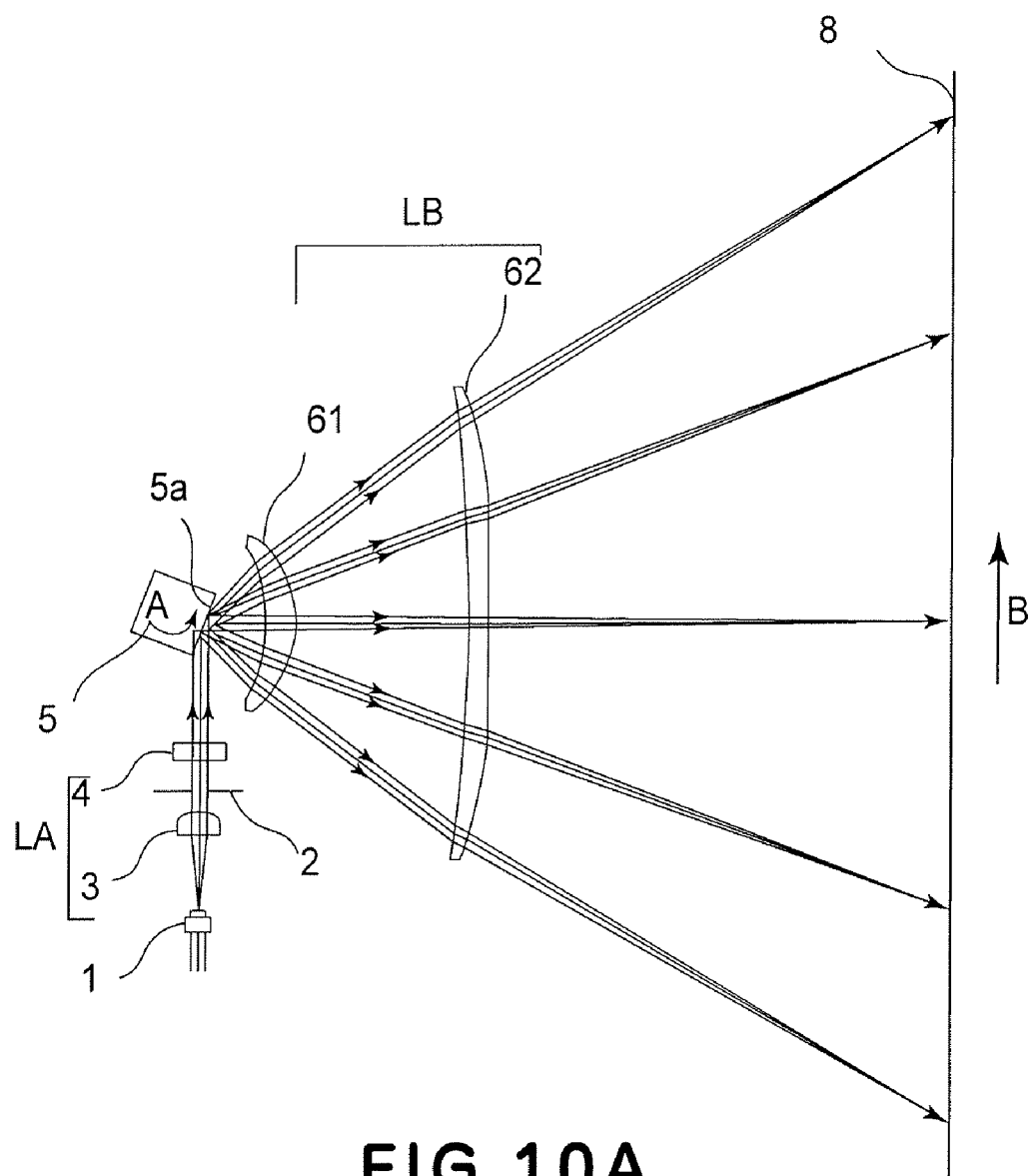
FIGS. 10A and 10B are sectional views, in the main-scan sectional plane and in the sub-scan sectional plane, respectively, of a second embodiment according to the present invention.
Figure 10B:
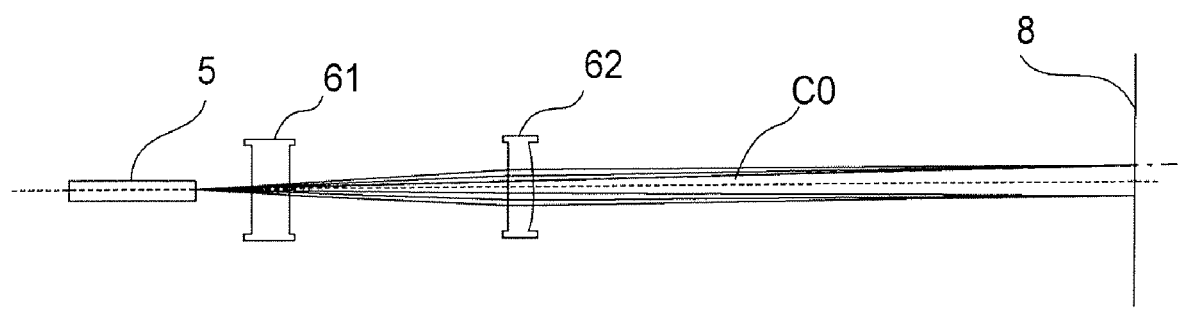

FIG. 10A is a sectional view, in the main-scan sectional plane, of a main portion of a second embodiment of the present invention. FIG. 10B is a sectional view of the second embodiment in the sub-scan sectional plane. In FIGS. 10A and 10B, the components corresponding to those shown in FIG. 1 are denoted by like numerals.

This embodiment differs from the first embodiment in that the imaging optical system LB comprises first and second imaging lenses (anamorphic lenses) 61 and 62. The remaining portion of this embodiment has a similar structure and a similar optical function as of the first embodiment, and similar advantageous results are obtainable with this embodiment.

In this embodiment, W [mm] is being defined as the light-beam width in the main-scan direction of the light beam that passes through the light exit surface of one (first imaging lens 61) of the imaging optical elements constituting the imaging optical system LB that is closest to the scan surface.

More specifically, in FIGS. 10A and 10B, denoted at LB is an imaging optical system having a light collecting function and an f-θ characteristic. It comprises first and second imaging lenses (anamorphic lenses) 61 and 62, made of a plastic material and having different powers with respect to the main-scan direction and the sub-scan direction. The imaging optical system LB serves to image the light beam scanningly deflected by the optical deflector 5 and based on imagewise information, upon the photosensitive drum surface 8 as a scan surface to be scanned.

Furthermore, with respect to the sub-scan sectional plane, there is a conjugate relationship between the deflecting surface 5a of the optical deflector 5 and the photosensitive drum surface 8 and, with this arrangement, any surface tilt of the deflecting surface can be compensated.

Table 3 below shows numerical values of a scanning optical system according to this embodiment of the present invention.

TABLE 3

| Used Wavelength | $\lambda$ (nm) | 790 |
| --- | --- | --- |
| Sub-Scan Oblique Incidence Angle | $\gamma$ (deg) | 2.0 |
| Refractive Index of Anamorphic Lens 1 | n1 | 1.52781 |
| Refractive Index of Anamorphic Lens 2 | n2 | 1.52781 |
| Distance from Deflection Surface to Anamorphic Lens 1 | d1 (mm) | 13.50 |
| Anamorphic Lens 1 Center Thickness | d2 (mm) | 6.00 |
| Distance between Anamorphic Lenses 1 and 2 | d3 (mm) | 35.10 |
| Anamorphic Lens 2 Center Thickness | d4 (mm) | 4.00 |
| Distance from Anamorphic Lens to Scan Surface | d5 (mm) | 95.21 |
| f-θ Coefficient | f | 131.00 |

| | Anamorphic Lens Shape | | Anamorphic Lens Shape | |
| --- | --- | --- | --- | --- |
| | 1st Surface | 2nd Surface | 1st Surface | 2nd Surface |
| R | −26.493 | −19.358 | −340.577 | 606.027 |
| r | −1000.000 | −1000.000 | infinite | −18.469 |

In an example where two imaging lenses are used, the lens that has a power in the sub-scan direction with respect to the oblique incidence angle γ (it is anamorphic lens 62 in this embodiment) or the lens surface thereof may be placed eccentrically or tilted with respect to the sub-scan direction and, with this arrangement, any spot rotation to be produced in the oblique incidence optical system can be corrected.

The reference axis setting method as has been described with reference to the first embodiment similarly applies to the example using two imaging lenses. Namely, with regard to a combined lens system of the two imaging lenses, by connecting the deflecting point of the light beam (incidence position) Zp incident on the deflecting surface 5a of the polygon mirror 5 and the imaging point of the light beam (incidence position) Zi imaged on the scan surface 8, a model similar to that of an optical system having a single imaging lens is provided.

Figure 11A:
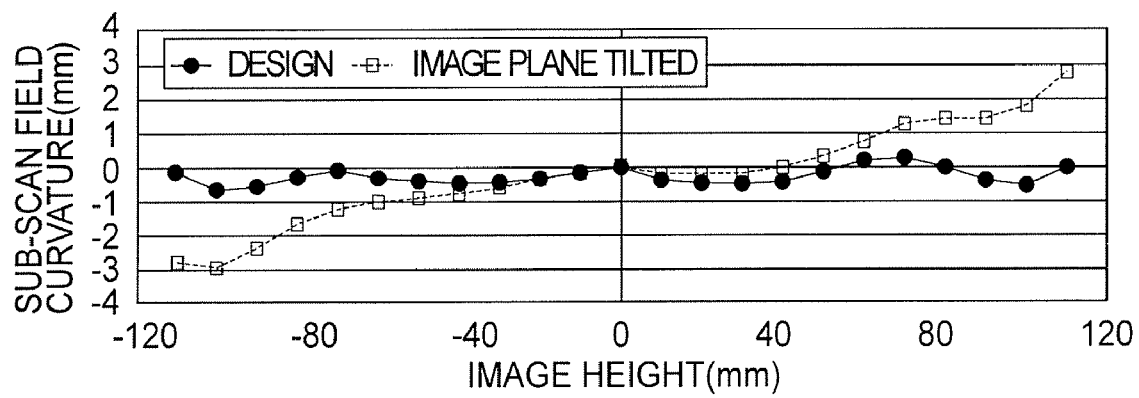
FIGS. 11A-11C are illustrations for explaining field curvature in the second embodiment of the present invention, and spots on the scan surface as the field curvature is tilted.
Figure 11B:
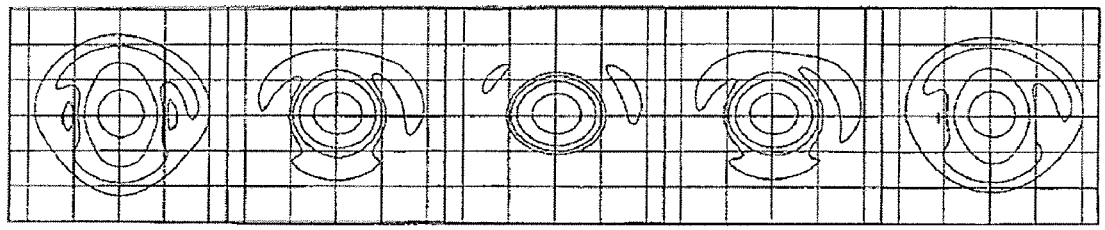
Figure 11C:
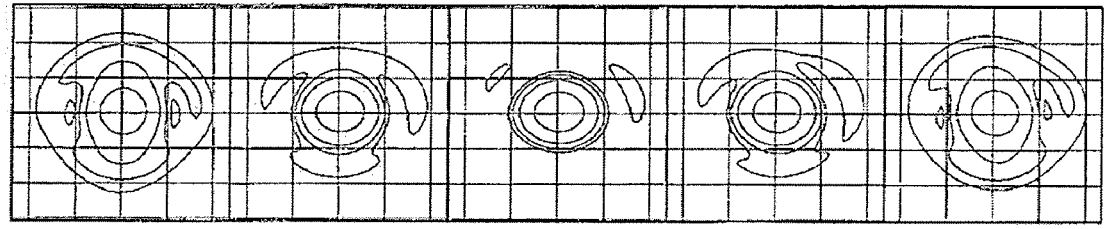

It is now assumed in this embodiment that, due to a change in shape of the second imaging lens (anamorphic lens) 62 in the sub-scan direction, a change |Δds/Δy| of field curvature in the sub-scan direction of an amount of about 0.02 (mm/mm) as shown in FIG. 11A has occurred. FIG. 11B illustrates the design spot shape on the scan surface at an image height 110 mm of the end portion of the effective image region. FIG. 11C illustrates the spot shape as the scan surface has changed by a particular amount.

It is seen from FIGS. 11A, 11B and 11C that, despite that the change |Δds/Δy| of field curvature in the sub-scan direction has a relatively large amount, the degree of spot rotation on the scan surface is small and, thus, the influence to the depth is small.

Here, if "$(1+1/\beta) \times \tan|(\gamma-\epsilon)| \times W$" at the left left-hand side of Equation (1) is calculated, the results are as follows.

$\beta = 1.7$ $\gamma = 2.0$

ε=0.86
W=3.9 mm
It follows from this that $(1+1/\beta) \times \tan|(\gamma-\epsilon)| \times W = 0.10$ (mm)

This satisfies the condition of Equation (1). Furthermore, since the left-hand side of Equation (2) is equal to 0.0021 (mm), and this satisfies the condition of Equation (2). It is seen from this that, even if field curvature occurs, the spot rotation can be well suppressed by this structure.

As compared with an optical system having a single imaging lens, if the number of lenses increases, the structure will be that the imaging lens having a power in the sub-scan direction is closer to the scan surface. Hence, comparing in terms of the same oblique incidence angle, the difference between the oblique incidence angle γ and the angle ε becomes smaller. On the other hand, in an optical system having two imaging lenses, in many cases the optical structure is such that the first imaging lens has a power mainly in the main-scan direction and the second imaging lens has a power mainly in the sub-scan direction. As a result, the light-beam width of light beam incident on the imaging lens having a power in the sub-scan direction becomes relatively small as it is converged in the main-scan direction by means of the first imaging lens.

Hence, even if the sub-scan imaging magnification β is small, the conditions of Equation (1) and Equation (2) are satisfied. From this standpoint and in consideration of the sensitivity of focus change in the sub-scan direction due to fluctuation in regard to manufacture or to any environmental change, an optical system having two imaging lenses will be advantageous.

It should be noted here that the structure of the imaging optical system is not limited to what described above. Three or more lenses may be used.

Furthermore, although in the first and second embodiments the imaging optical element or elements constituting the imaging optical system are an imaging lens (refractive optical element), a diffractive optical element may be used as the imaging optical element or elements of the imaging optical system.

[Image Forming Apparatus]

Figure 12:
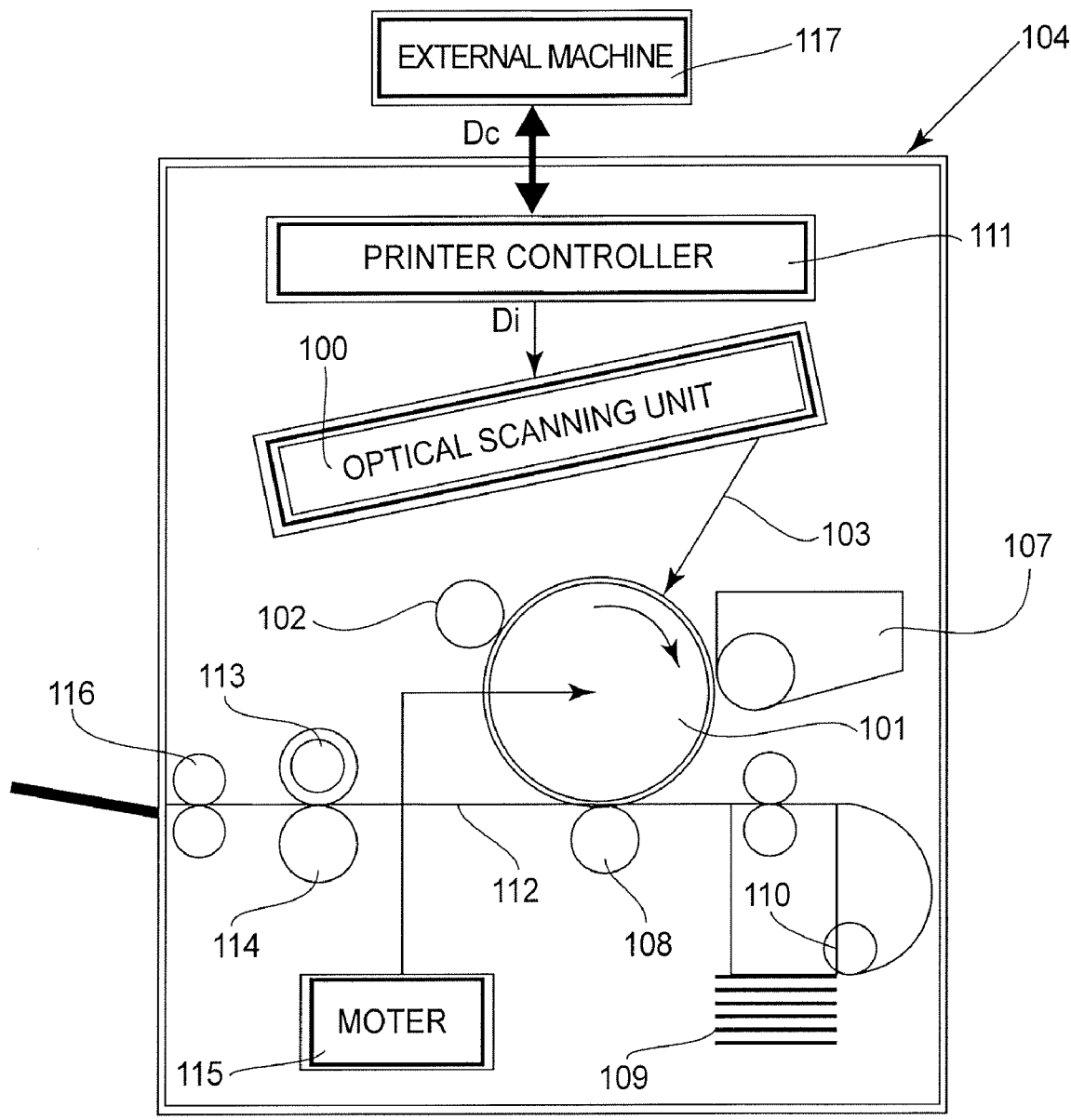
FIG. 12 is a sectional view, in the sub-scan sectional plane, of an image forming apparatus according to an embodiment of the present invention.

FIG. 12 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 12) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 15) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

Figure 15:
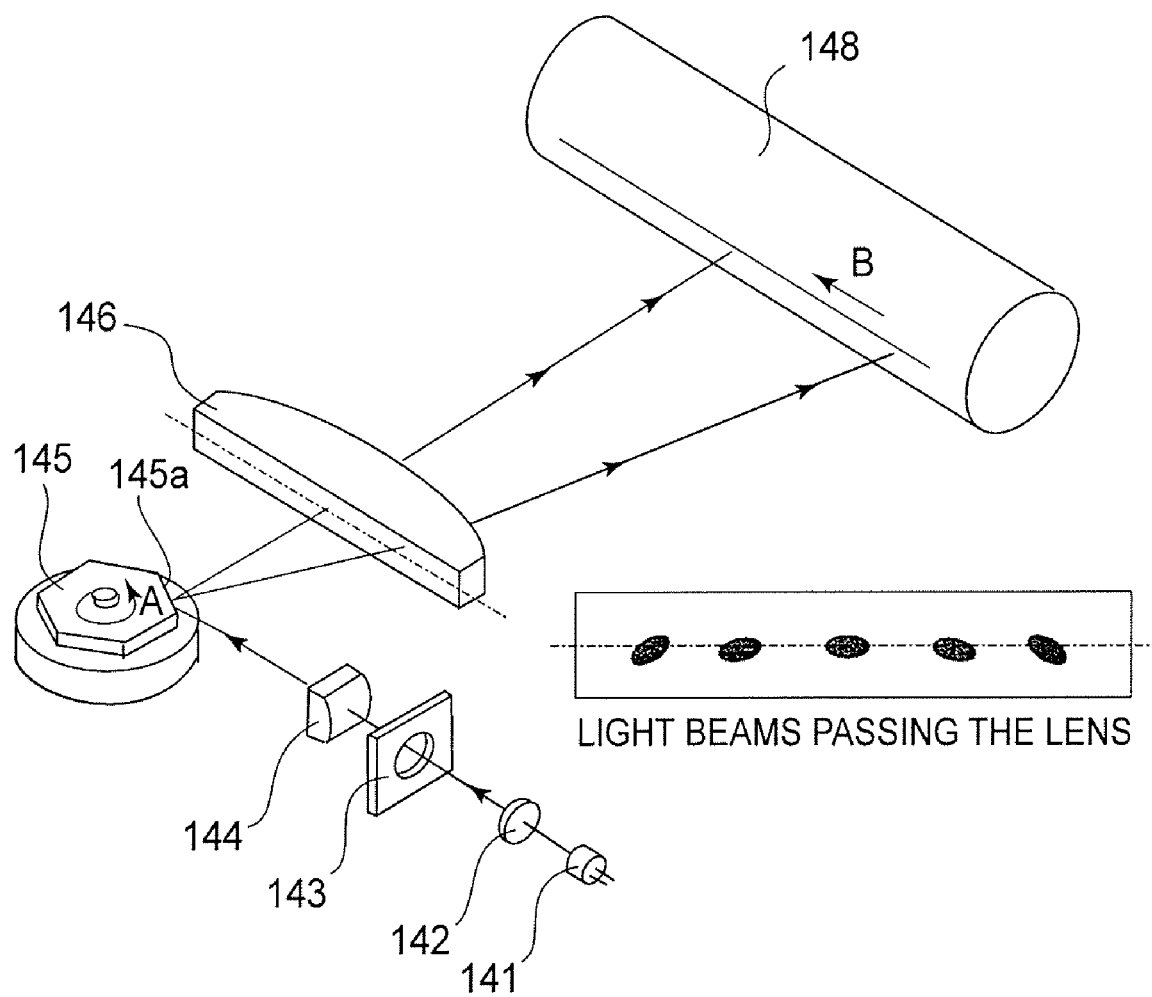
FIG. 15 is a schematic view for explaining how the skew is caused.

While not shown in FIG. 15, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

[Color Image Forming Apparatus]

Figure 13:
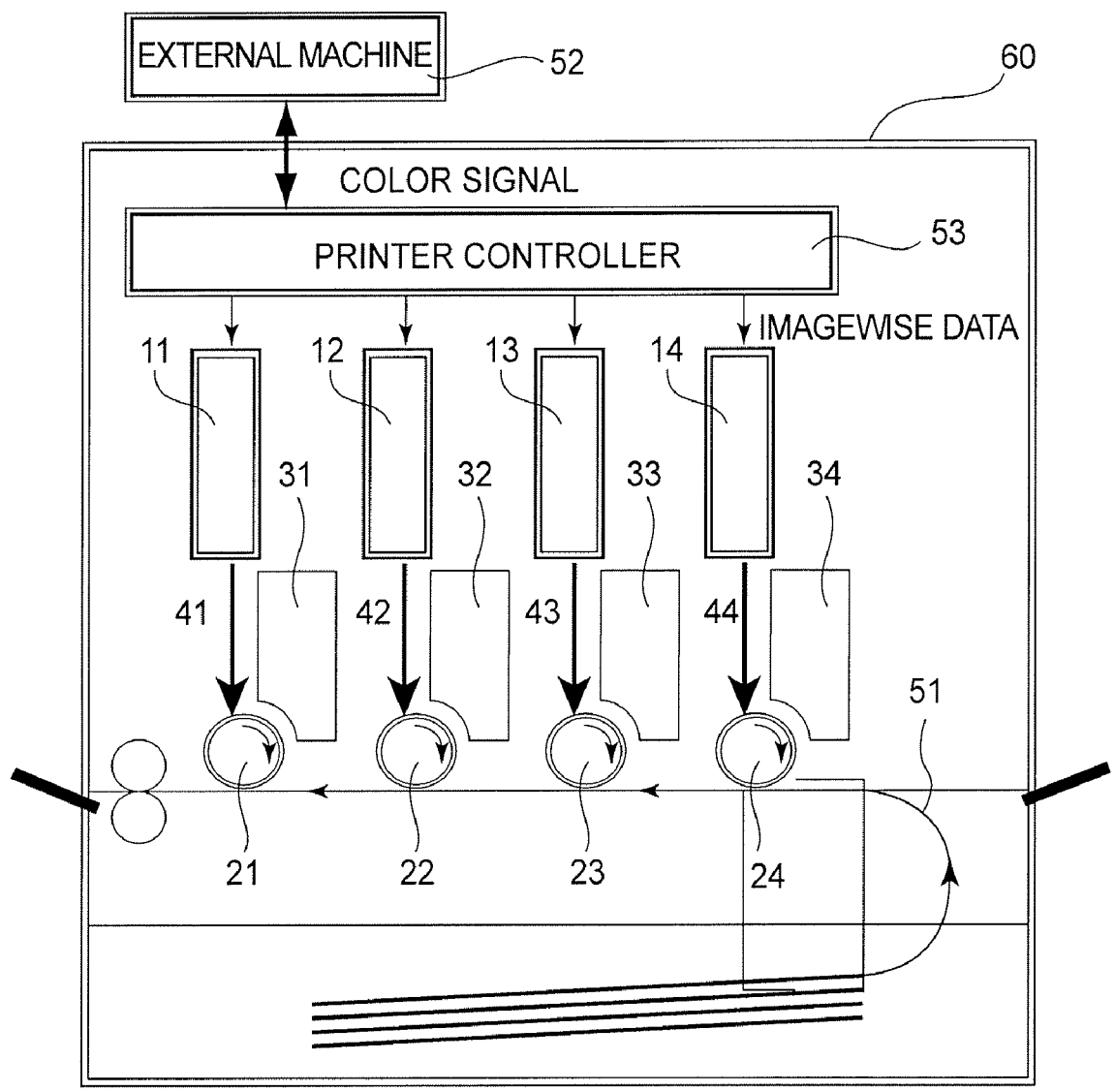
FIG. 13 is a schematic view of a main portion of a color image forming apparatus according to an embodiment of the present invention.
Figure 14:
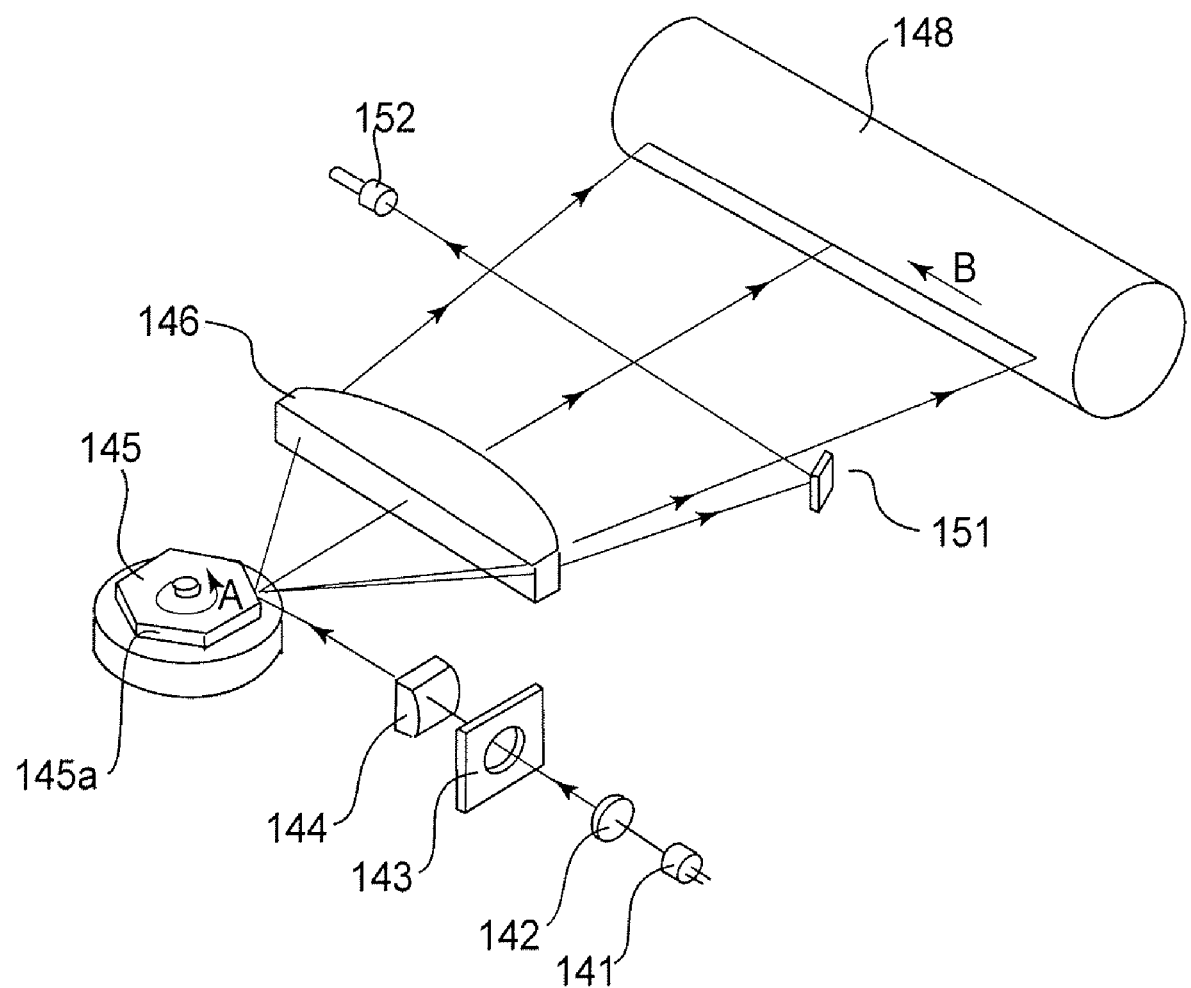
FIG. 14 is a schematic view of a main portion of a conventional optical scanning system.

FIG. 13 is a schematic view of a main portion of a color image forming apparatus according to an embodiment of the present invention. This embodiment is directed to a tandem type color image forming apparatus in which four optical scanning systems are provided so as to record imagewise data upon the surfaces of corresponding photosensitive drums (image bearing members) in parallel to each other.

In FIG. 13, denoted generally at 60 is a color image forming apparatus, and denoted at 81, 82, 83 and 84 are optical scanning systems having a structure according to any one of the preceding embodiments. Denoted at 21, 22, 23 and 24 are photosensitive drums (image bearing members), and denoted at 31, 32, 33 and 34 are developing devices, respectively. Denoted at 51 is a conveyance belt.

In FIG. 13, the color image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and K (black).

These imagewise data are inputted into the optical scanning systems 81, 82, 83 and 84, respectively. In response, these optical scanning systems produce light beams 41, 42, 43 and 44 having been modulated in accordance with the associated imagewise data. Through these light beams, the photosensitive surfaces of the photosensitive drums 21, 22, 23 and 24 are scanned in the main-scan direction.

In the color image forming apparatus of this embodiment, four optical scanning systems 81, 82, 83 and 84 are provided and these correspond to colors of C (cyan), M (magenta), Y (yellow) and K (black), respectively. These scanning systems are operable in parallel to each other to record imagewise signals upon the surfaces of the photosensitive drums 21, 22, 23 and 24, respectively, so that a color image can be printed at high speed.

As described, the color image forming apparatus of this embodiment uses four optical scanning systems 81, 82, 83 and 84 to produce latent images for different colors upon the surfaces of corresponding photosensitive drums 21, 22, 23 and 24, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2005-378712 filed Dec. 28, 2005, for which is hereby incorporated by reference.

What is claimed is:

1. An optical scanning system, comprising:
light source means;
an optical deflector having a deflecting surface, for scanningly deflecting a light beam emitted from said light source means; and
an imaging optical system for imaging the light beam, deflected by said deflecting surface of said optical deflector, upon a scan surface to be scanned;
wherein, when $\gamma$ ($\gamma \neq 0$) refers to an angle which is defined, in a sub-scan sectional plane, between a principal ray of the light beam from said light source means and a normal to said deflecting surface of said optical deflector as the light beam is going to be incident on said deflecting surface, $\beta$ refers to an imaging magnification of said imaging optical system with respect to a sub-scan direction, W [mm] refers to a light-beam width, in a main-scan direction, of a light beam that passes a light exit surface of an imaging optical element, of said imaging optical system, which element is closest to the scan surface, and $\epsilon$ ($\epsilon \neq \gamma$) refers to an angle defined, in the sub-scan sectional plane, between an optical axis of said imaging optical system and a straight line that connects a point of deflection of the light beam incident on said deflecting surface of said optical deflector and an imaging point of the light beam being imaged on the scan surface, a relation $$\frac{1+\beta}{\beta} \times |\tan(\gamma - \varepsilon)| \times W \leq 0.15 \text{ [mm]}$$

is satisfied.

2. An optical scanning system, comprising:
light source means;
an optical deflector having a deflecting surface, for scanningly deflecting a light beam emitted from said light source means; and
an imaging optical system for imaging the light beam, deflected by said deflecting surface of said optical deflector, upon a scan surface to be scanned;
wherein, when $\gamma$ ($\gamma \neq 0$) refers to an angle which is defined, in a sub-scan sectional plane, between a principal ray of the light beam from said light source means and a normal to said deflecting surface of said optical deflector as the light beam is going to be incident on said deflecting surface, $\beta$ refers to an imaging magnification of said imaging optical system with respect to a sub-scan direction, W [mm] refers to a light-beam width, in a main-scan direction, of a light beam that passes a light exit surface of an imaging optical element, of said imaging optical system, which element is closest to the scan surface, and $\epsilon$ ($\epsilon \neq \gamma$) refers to an angle defined, in the sub-scan sectional plane, between an optical axis of said imaging optical system and a straight line that connects a point of deflection of the light beam incident on said deflecting surface of said optical deflector and an imaging point of the light beam being imaged on the scan surface, and where an amount of change $\Delta ds$ of field curvature ds, in the sub-scan direction, with a positional change $\Delta y$ at a scan position y in the main-scan direction on the scan surface is denoted by $\Delta ds/\Delta y$, a relation $$\frac{1+\beta}{\beta} \times |\tan(\gamma - \varepsilon)| \times W \times \left|\frac{\Delta ds}{\Delta y}\right| \leq 0.004 \text{ [mm]}$$

is satisfied.

3. An optical scanning system according to claim 1, wherein the imaging magnification $\beta$ of said imaging optical system in the sub-scan direction satisfies the following condition:

$$1.0 \leq |\beta s| \leq 3.0$$

4. An optical scanning system according to claim 1, wherein the angle y defined, in a sub-scan sectional plane, between the principal ray of the light beam from said light source means and the normal to said deflecting surface of said optical deflector as the light beam is going to be incident on said deflecting surface, satisfies the following condition:

$$1.5(\text{deg.}) \leq \gamma \leq 3.5(\text{deg.})$$

5. An image forming apparatus, comprising:
an optical scanning system as recited in claim 1;

a photosensitive material disposed at a scan surface to be scanned;

a developing device for developing an electrostatic latent image formed on said photosensitive material through a light beam scanned by said optical scanning system, to produce a toner image;

a transferring device for transferring the developed toner image onto a transfer material; and a fixing device for fixing the transferred toner image, on the transfer material.

6. An image forming apparatus, comprising:

an optical scanning system as recited in claim 1; and a printer controller for converting code data supplied from an outside machine into an imagewise signal and for inputting the imagewise signal into said optical scanning system.

7. A color image forming apparatus, comprising:

a plurality of optical scanning systems each being as recited in claim 1; and a plurality of image bearing members disposed at scan surfaces, respectively, to be scanned by said optical scanning system, respectively, for forming images of different colors.

8. A color image forming apparatus according to claim 7, further comprising a printer controller for converting a color signal supplied from an outside machine into imagewise data of different colors and for inputting the imagewise data into corresponding optical scanning systems.

* * * * *

UNITED STATES PATENT AND TRADEMARK OFFICE
CERTIFICATE OF CORRECTION

PATENT NO. : 7,304,778 B2
APPLICATION NO. : 11/617081
DATED : December 4, 2007
INVENTOR(S) : Tanimura Page 1 of 1

It is certified that error appears in the above-identified patent and that said Letters Patent is hereby corrected as shown below:

IN THE DRAWINGS:
Sheet 10, FIG. 12, "MOTER" should read --MOTOR--.

COLUMN 10:
Line 15, "be" should be deleted.

COLUMN 19:
Line 9, "image," should read --image--.

COLUMN 20:
Line 7, "system," should read --systems,--.

Signed and Sealed this

Third Day of March, 2009

JOHN DOLL
*Acting Director of the United States Patent and Trademark Office*